Feb. 12, 1935.  J. L. MAULL  1,990,949
FRUIT JUICE EXTRACTOR
Filed May 22, 1934

Inventor
James L. Maull
By Mason Fenwick Lawrence
Attorney

Patented Feb. 12, 1935

1,990,949

UNITED STATES PATENT OFFICE 1,990,949

FRUIT JUICE EXTRACTOR

James L. Maull, Orlando, Fla.

Application May 22, 1934, Serial No. 727,008

6 Claims. (Cl. 100—49)

This invention relates to a fruit juice extractor especially adapted for citrus fruits. It is an improvement upon the invention described in my Patent 1,922,773, granted August 15, 1933.

One of the objects of the invention is to provide an extractor of the cup and tube type in which the portion of the tube which is insertable into the fruit is adjustable in length to suit different sized fruit, so that the device is equally adaptable to an orange as to a grapefruit.

Another object of the invention is the provision of means for locking the tube in various positions of adjustment with respect to the cup.

A further object of the invention is to provide an extractor of the type described in which the tube is provided with longitudinal corrugations intersecting the transverse plane of the cup in all positions of adjustment of the tube, whereby the upper parts of the corrugations extend into the fruit forming free passages for the discharge of the juice, while the lower parts open directly into the glass or other vessel over which the cup may be positioned.

Another object of the invention is the substitution in the tube of corrugations instead of slots as in the device of my patent hereinabove referred to, to facilitate cleaning, and for a like purpose, the ends of the tube are unconstricted.

Other objects of the invention will appear as the following description of a preferred and practical embodiment thereof proceeds.

In the drawing which accompanies and forms a part of the following specification and throughout the several figures of which the same characters of reference have been employed to designate identical parts:

Figure 1:
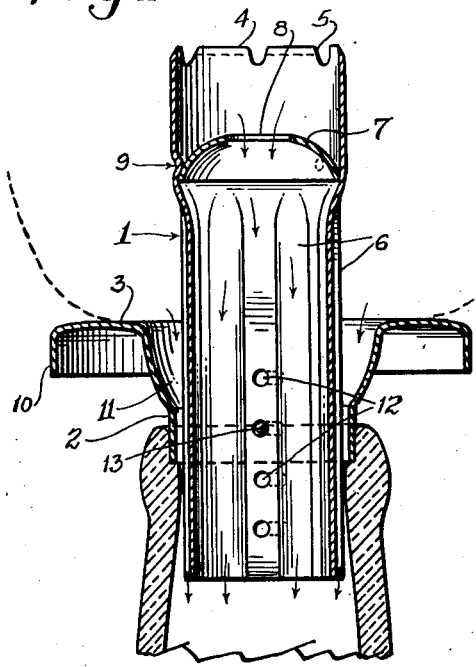
Figure 1 is a longitudinal section through my improved juice extractor illustrating its use in connection with a milk bottle.
Figure 2:
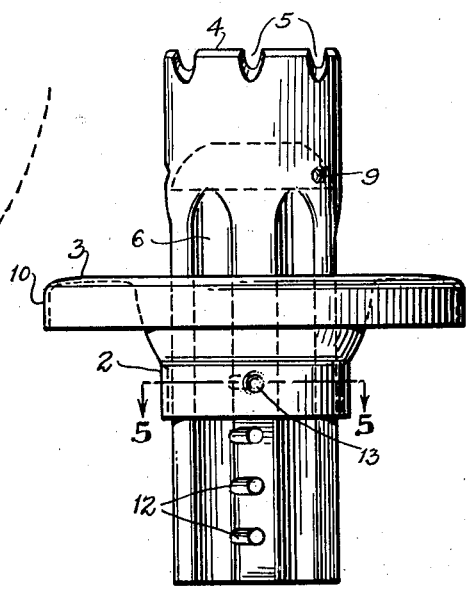
Figure 2 is a side elevation.
Figure 3:
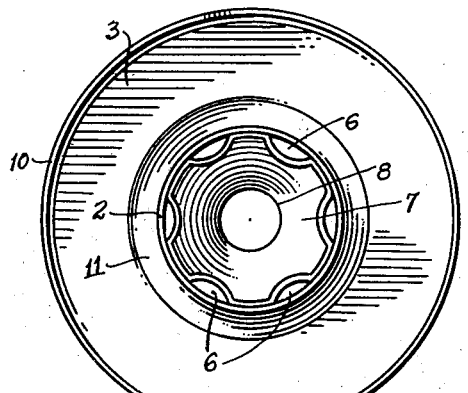
Figure 3 is a bottom plan view.
Figure 4:
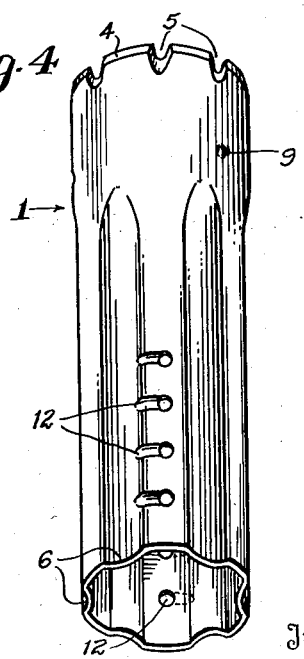
Figure 4 is a perspective view of the tube.
Figure 5:
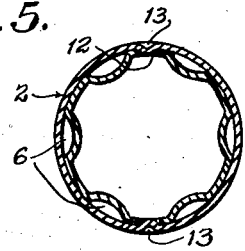
Figure 5 is a cross section through the tube.

Referring now in detail to the several figures the numeral 1 represents the tubular element of the juice extractor which is telescopically mounted, with frictional fit in the lower sleeve portion 2 of the cup 3. The tube 1 is formed at its upper end with a knife edge 4 serrated at intervals by the indentations 5. The tube 1 at some slight distance below its upper end is provided with a circumferential series of longitudinal corrugations 6 pressed in from the surface of the tube, and in the act of pressing the material is incidentally drawn in so that the diameter of the tube in the zone of the corrugations is somewhat less than its diameter adjacent the upper end. This difference in diameter is not material to the functioning of the invention, nor is it a necessary limitation of the scope of the invention.

Within the tube 1 and at a point above the zone of corrugations is a baffle or partition 7 preferably centrally perforated as at 8. This partition is secured within the tube 1 by resting upon the upper ends of the corrugations and having the metal slightly struck in as at 9 above the edge of the partition 7. The cup 3 is provided with the usual flange 10 adapting it to rest over a glass or cup without risk of its slipping off, and with a funnel-like annular channel 11 surrounding the tube 1 when the latter is in place. Said tube is freely slidable within the cup 3 and may be secured in any position of longitudinal adjustment by means of a vertical series of indents 12 which may be selectively engaged by a tit 13 struck in from the side of the cup 3. In making the adjustment, the tube 1 is pushed either up or down to the approximate desired height and then slightly rotated to bring the tit into the appropriate one of the indents 12.

The telescopic relation of the tube and cup permits regulation of the length of that part of the tube which projects above the cup and which is adapted to be inserted in the fruit, so as to suit the device to the extraction of juice from fruit of any size. For example, if an orange is to be dejuiced, the tube 1 is pushed down to the lowermost height provided by the series of indents 12 and then locked in position. If it is a grapefruit, the tube is raised to an adjustment provided by one of the other indents.

The knife edge 4 at the top of the tube cuts through the membrane surrounding the sections of the citrus fruit and sets the juice free. As the tube is pushed up into the pulp, the rag and seeds are forced back by the partition 7, any juice that may have been entrained with the rag escaping through the perforation 8.

It will be understood that the longitudinal series of corrugations 6 intersect the plane of the cup regardless of its position of adjustment, that is to say, while the upper ends of the corrugations extend above the cup, the lower ends reach below it. The corrugations thus form continuous passages leading into the body of the fruit at one end and directed into the bottle or other receptacle at the other end so that upon squeezing the orange or grapefruit with the hand, the juice is freely discharged. Such juice as may leak around the hole which the knife edge 4 cuts into the rind of the grapefruit or orange is caught in the channel 11 and discharged through the corrugations into the receptacle.

One of the virtues of the present construction over that shown in my patented device is that the cup and tube may be entirely separated for purpose of cleansing and that the corrugations are more readily cleansed than would be slots cut through the wall of the tube as in my earlier device. Furthermore, both ends of the tube are altogether unrestricted, permitting easy and complete cleansing of the inside of the tube.

It is obvious that numerous modifications may be made in the construction of my juice extractor without transcending the scope of the invention and it will be understood therefore that the specific details of construction as illustrated and described are merely by way of example and not to be construed as limiting the invention as defined in the appended claims.

What I claim is:

1. A juice extractor comprising a tubular member having a cutting edge at its upper end and provided with longitudinal corrugations below its upper end, and a cup surrounding said tubular member intermediate the ends of the corrugations and communicating therewith, the latter forming juice passages externally of said tubular member and extending from above to below said cup.

2. A juice extractor comprising a tubular member having a cutting edge at its upper end, and provided with longitudinal corrugations below its upper end, and a cup separable from said tubular member surrounding said tubular member intermediate the ends of the corrugations and communicating therewith, the latter providing juice passages externally of said tubular member extending from above to below said cup.

3. A juice extractor comprising a tubular member having a cutting edge at its upper end, and provided with longitudinal corrugations below its upper end, and a cup surrounding said tubular member and adjustable along said tubular member in the zone of said corrugations, the latter providing juice passages externally of said tubular member extending from above to below said cup and with which said cup communicates.

4. A juice extractor comprising a tubular member having a cutting edge at its upper end, and being provided with a circumferential series of longitudinal corrugations below its upper end, and a cup surrounding said tubular member and communicating with said corrugations, said cup being adjustable along said tubular member in the zone of said corrugations, said tubular member being provided with a series of elements adapted to be selectively inter-engaged with means on said cup for locking the latter in any of its several positions of adjustment.

5. A juice extractor comprising a tubular member having a cutting edge at its upper end, and provided with longitudinal corrugations below its upper end, a cup surrounding said tubular member intermediate the ends of said corrugations and communicating therewith, said corrugations providing juice passages externally of said tubular member extending from above to below said cup, and a perforated baffle in said tubular member, retained from displacement in one direction by the upper ends of said corrugations.

6. A juice extractor comprising a tubular member unconstricted in cross section at both ends, having a cutting edge at its upper end and being provided with a circumferential series of longitudinal corrugations below said upper end, and a cup surrounding said tubular member and adjustable longitudinally thereto in the zone of said corrugations, the latter providing juice passages externally of said tubular member extending from above to below in said cup in all positions of adjustment of said cup.

JAMES L. MAULL.